United States Patent
Tanahashi et al.

(10) Patent No.: US 7,207,123 B2
(45) Date of Patent: Apr. 24, 2007

(54) DRY AIR-SUPPLYING APPARATUS AND TREATING APPARATUS

(75) Inventors: Takashi Tanahashi, Tokyo-To (JP); Takanobu Asano, Tokyo-To (JP); Ken Nakao, Tokyo-To (JP); Katsuhiro Yamashita, Tokyo-To (JP)

(73) Assignees: Tokyo Electron Limited, Tokyo (JP); Nichias Corporation, Tokyo-To (JP)

( * ) Notice: Subject to any disclaimer, the term of this patent is extended or adjusted under 35 U.S.C. 154(b) by 83 days.

(21) Appl. No.: 10/528,230

(22) PCT Filed: Sep. 19, 2003

(86) PCT No.: PCT/JP03/12004

§ 371 (c)(1),
(2), (4) Date: Mar. 18, 2005

(87) PCT Pub. No.: WO2004/026442

PCT Pub. Date: Apr. 1, 2004

(65) Prior Publication Data

US 2005/0246918 A1 Nov. 10, 2005

(30) Foreign Application Priority Data

Sep. 20, 2002 (JP) .............................. 2002/274214

(51) Int. Cl.
*F26B 21/06* (2006.01)

(52) U.S. Cl. .................................. 34/80; 62/94; 96/125
(58) Field of Classification Search .................... 34/77, 34/78, 19, 80, 90; 62/93, 94; 96/125, 144

See application file for complete search history.

(56) References Cited

U.S. PATENT DOCUMENTS 3,470,708 A * 10/1969 Weil et al. ..................... 62/271

(Continued)

FOREIGN PATENT DOCUMENTS

GB 1 533 718 11/1978

(Continued)

OTHER PUBLICATIONS

International Preliminary Examination Report (PCT/IPEA/409) (Translated) for PCT/JP2003/012004.

(Continued)

*Primary Examiner*—S. Gravini
(74) *Attorney, Agent, or Firm*—Smith, Gambrell & Russell, LLP (57) ABSTRACT

Two rotors 18a, 18b each housing a honeycomb structure 25 carrying an absorbent is driven for rotation by a common motor 19. Partitioning members 17 define an absorbing zone S and a recovery zone U in the rotor depending on the angular positional relationship between the partitioning members 17 and the rotor corresponding thereto. In the absorbing zone S, the absorbent removes moisture and organic matters from air passing therethrough. In the recovery zone U, recovery of the absorbent deteriorated by absorbing the moisture and the organic matters is preformed by using heated dry air. Air sucked from a transfer space 10 of the processing system sequentially passes through the absorbing zones of both the rotors via a circulation passage 20, thereafter returned to the transfer space. A part of clean dry air having passed through the absorbing zones of both the rotors is supplied into an exhaust passage 21, and is heated by a heater, and passes through the recovery zones of both the rotors.

15 Claims, 6 Drawing Sheets

U.S. PATENT DOCUMENTS 3,889,742 A * 6/1975 Rush et al. .................... 96/144
5,248,325 A     9/1993 Kagimoto et al.
6,016,710 A * 1/2000 Boles et al. ............. 73/861.42

FOREIGN PATENT DOCUMENTS

| JP | 61/071821 | 4/1986 |
|---|---|---|
| JP | 61-071821 | 4/1986 |
| JP | 03-248837 | 11/1991 |
| JP | 05-038413 | 2/1993 |
| JP | 06-267933 | 9/1994 |
| JP | 09-047627 | 2/1997 |
| JP | 2000-296309 | 10/2000 |
| JP | 2001-044089 | 2/2001 |
| JP | 2001-276551 | 10/2001 |
| JP | 2002/013759 | 1/2002 |
| JP | 2002-186824 | 7/2002 |

OTHER PUBLICATIONS

Notification of Transmittal of Copies of Translation of the International Preliminary Examination Report issued for PCT/JP2003/012004.

* cited by examiner

DRY AIR-SUPPLYING APPARATUS AND TREATING APPARATUS

TECHNICAL FIELD

The present invention relates to a dry air supplying apparatus and a processing system.

BACKGROUND ART

In a semiconductor device manufacturing process, a process object such as a semiconductor wafer is subjected to various treatments such as an oxidation treatment, a diffusion treatment, and a CVD treatment. Various processing systems, for example, heat-treatment systems are used for carrying out these treatments. A vertical heat-treatment system has a transfer space (also referred to as a loading area) in which wafers are conveyed between a transporting container for containing therein a plurality of, for example, 25 wafers, and a processing vessel for performing a predetermined treatment to the wafers contained therein.

In order to prevent the growth of natural oxide films on the surfaces of the wafers in the transfer space, a great amount (250 to 400 liters per minute) of inert gas, such as a nitrogen gas, is supplied into the transfer space to establish therein an atmosphere of an oxygen concentration less than 30 ppm. A chemical filter is provided for removing organic gases from the atmosphere in the transfer space.

It has been proposed that a dry gas of a low dew point be supplied to a transfer space so as to prevent the growth of natural oxide films (see JP6-267933A, for example). A dry-type dehumidifying apparatus for generating a dry gas of a low dew point has also been proposed (see JP2000-296309A and JP63-50047A, for example).

However, when supplying nitrogen gas, a large amount of expensive nitrogen gas is required, which results not only in a high running cost of a processing system but also in a risk of oxygen deficiency. Further, it is difficult to recover a deteriorated chemical filter by removing organic matters adhered thereto. Moreover, a dry air generating apparatus has a complicated structure and thus is costly.

SUMMARY OF THE INVENTION

The present invention is made in view of the above problems.

A first object of the present invention is to provide a dry air supplying apparatus and a processing system which are capable of avoiding a risk of oxygen deficiency and preventing the growth of the natural oxide film on a process object, by using dry air instead of an inert gas.

A second object of the present invention is to provide a dry air supplying apparatus and a processing system having compact and simple configurations.

A third object of the present invention is to provide a dry air supplying apparatus which generates little amount of particles, and a processing system capable of preventing a process object from being contaminated with particles.

In order to achieve the above objects, the present invention provides a dry air supplying apparatus including: two rotors respectively supported by support frames, each of the rotors having a component member carrying an absorbent; partitioning members respectively supported by the support frames, each of the partitioning members defining at least an absorbing zone and a recovery zone in the rotor corresponding to the partitioning member, depending on an angular positional relationship between the rotor and the corresponding partitioning member, wherein, in the absorbing zone, moisture and organic matters are removed from air passing therethrough by the absorbent in the absorbing zone, and in the recovery zone, the absorbent deteriorated due to absorption of the moisture and the organic matters is recovered; a common drive means for driving both the rotors for rotation; a circulation passage that guides air sucked from a target space so as to sequentially pass through the absorbing zones of the rotors for removing moisture and organic matters from the air, and thereafter return to the target space; and an exhaust passage, provided with heating means, that guides a part of the air having passed through the absorbing zones of the rotors so as to pass through the heating means, and thereafter pass through the recovery zones of the rotors for desorbing the moisture and the organic matters from the absorbents of the rotors.

The present invention provides a processing system including: a processing unit adapted to perform a predetermined process to a process object; a transfer space in which a process object to be processed by the processing unit or a process object having been processed by the processing unit is conveyed; and a dry air supplying apparatus adapted to supply air, from which moisture and organic matters are removed, into the transfer space; said dry air supplying apparatus including: two rotors respectively supported by support frames, each of the rotors having a component member carrying an absorbent; partitioning members respectively supported by the support frames, each of the partitioning member defining at least an absorbing zone and a recovery zone in the rotor corresponding to the partitioning member, depending on an angular positional relationship between the rotor and the corresponding partitioning member, wherein, in the absorbing zone, moisture and organic matters are removed from air passing therethrough by the absorbent in the absorbing zone, and in the recovery zone, the absorbent deteriorated due to absorption of the moisture and the organic matters is recovered; a common drive means for driving both the rotors for rotation; a circulation passage that guides air sucked from the transfer space so as to sequentially pass through the absorbing zones of the rotors for removing moisture and organic matters from the air, and thereafter return to the transfer space; and an exhaust passage, provided with heating means, that guides a part of the air having passed through the absorbing zones of the rotors so as to pass through the heating means, and thereafter pass through the recovery zones of the rotors for desorbing the moisture and the organic matters from the absorbents of the rotors.

In a preferred embodiment, cooling means is arranged in the circulation passage between a former-stage rotor and a latter-stage rotor of the two rotors, for cooling air having passed through the absorbing zone of the former-stage rotor; the partitioning member corresponding to the latter-stage rotor is configured to define, in the latter-stage rotor, a cooling zone in which the component member carrying the absorbent is cooled, in addition to the absorbing zone and the recovery zone; and the exhaust passage is configured to guide air, having passed through the former-stage rotor, the cooling means and the latter-stage rotor, to pass through the cooling zone of the latter-stage rotor before the air passes through the recovery zones of the former-stage rotor and latter-stage rotor and the heating means.

Preferably, an outlet portion of the circulation passage connected to the transfer space is provided with a filter in order to remove particles generated at contacts between the rotors and the partitioning members. Thus, the transfer space can be prevented from being contaminated with particles.

In a preferred embodiment, the drive means has two belt wheels to drive the two rotors for rotation via endless belts, respectively, and the two belt wheels have different diameters so that the two rotors rotate at different speeds. Thus, the two rotors can rotate at different speeds, with a simple structure of the processing system.

In view of reducing a manufacturing cost of the system, the exhaust passage may be provided with a common heating means to heat air to be supplied respectively to the recovery zones of the two rotors.

The processing system may further includes: a dew-point meter adapted to measure a dew point of an atmosphere of the transfer space; a dry air controller adapted to control the dry air supplying apparatus based on a measured result by the dew-point meter so that the dew point in the transfer space is maintained at a predetermined value.

In a preferred embodiment, the partitioning member includes a circumferential element arranged in correspondence to a periphery of an end portion of the rotor, and a plurality of radial elements extending from a center of the circumferential element to the circumferential element to divide a space surrounded by the circumferential element into a plurality of zones; and a fin-shaped, flexible sealing member is attached to each of the radial elements, the sealing member is pressed against an end face of the rotor facing the sealing member, and each of the sealing member is configured so that the sealing member slides on the end face of the rotor facing to the sealing member while a tip of the sealing member is resiliently bent towards a rotation direction of the rotor facing the sealing member; whereby air having passed through the different zones of each of the rotors is prevented from being mixed to each other. Since the sealing member is attached to each of the radial elements, the respective zones can be securely sealed from each other. Further, the frictional force exerted between the sealing member and the rotor can be reduced. As a result, generation of particles caused by the friction between the sealing member and the rotor can be decreased.

Preferably, the circumferential element of each of the partitioning members is provided with a circumferential packing member to be pressed against a peripheral edge or an outer circumference of the rotor facing the circumferential element, and a slip sheet is adhered to a contact surface of the packing member facing the rotor corresponding to the packing member. Since the packing member is arranged on the circumferential element, the circumferential element and the rotor can be securely sealed from each other. Further, the frictional force exerted between the packing member and the rotor can be reduced. As a result, generation of particles caused by the friction between the packing member and the rotor can be decreased.

In another preferred embodiment of the processing system, the drive means is configured to intermittently rotate the two rotors; and the partitioning member is configured to leave an end face of the rotor facing the partitioning member when the rotor is rotating, and contact the end face of the rotor when the rotor halts rotation. Since the partitioning member do not slide on the rotor in rotation, generation of particles which might occur due to the contact between the partitioning member and the rotor can be substantially perfectly prevented.

In the processing system, the dry air supplying apparatus may be connected to a transfer space of another processing system. Since the plurality of processing systems can share the dray air supplying apparatus, a cost required for the whole structure including the plurality of processing systems can be reduced.

DESCRIPTION OF THE PREFERRED EOBODIMENTS

Embodiments of the present invention will be described in detail below with reference to the accompanied drawings.

Figure 1:
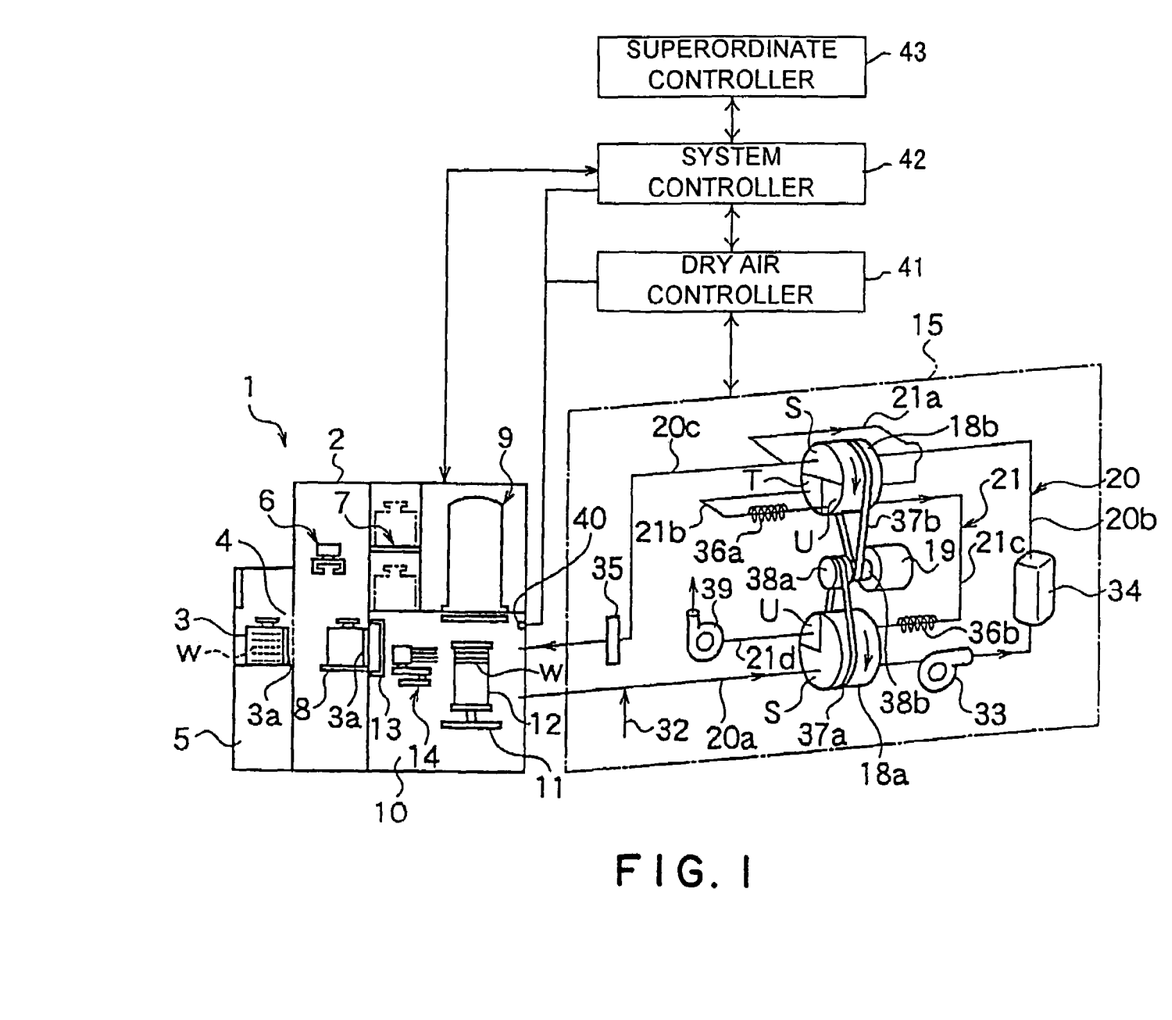
FIG. 1 is a view schematically showing the structure of a processing system including a dry air supplying apparatus according to the present invention.

In FIG. 1, the reference numeral 1 designates a processing system such as a vertical heat-treatment system. The vertical heat-treatment system 1 includes a housing 2 serving as an outer shell thereof. Provided in the front part of the housing 2 is a loading/unloading port 4, through which a transporting container 3 (also referred to as a carrier) for containing therein a plurality of, e.g., 25 process objects such as semiconductor wafers W is loaded and unloaded to and from the heat-treatment system 1.

A table 5, on which the transporting container 3 is placed, is arranged in front of the loading/unloading port 4. Preferably, the transporting container 3 is a so-called close-type carrier, which is capable of containing therein the wafers W in an airtight fashion, and which has a detachable lid 3a for closing a front opening of the carrier.

Provided in the front part of the interior of the housing 2 are a conveying mechanism 6 for conveying the transporting container 3, a storage shelf 7 for storing thereon the transporting containers 3, and a transfer stage 8 (transfer part) on which the transporting container 3 is placed for transferring the wafers W.

Provided in the rear upper part of the interior of the housing 2 is a processing vessel 9 (a vertical heat-treatment furnace in the illustrated embodiment) adapted to perform a predetermined treatment such as a CVD treatment, to a plurality of, e.g., about 100 wafers W contained therein. A loading area 10 is formed below the processing vessel 9. The loading area 10 provides a space in which the wafers W are transferred between the transporting container 3 placed on the transfer stage 8 and a boat 12 which is described below. The loading area 10 is referred to as a transfer space 10 hereinafter. The transfer space 10 is a target space, which is air-conditioned by a dry air supplying apparatus 15, which will be described later.

A cover member 11 for closing a throat of the processing vessel 9 is arranged in the transfer space 10. The cover member 11 can move vertically by an elevating mechanism (not shown). The boat 12 which holds therein a plurality of, for example, about 100 wafers W with vertical intervals is mounted to the cover member 11. The boat 12 is loaded and unloaded to and from the processing vessel 9 by the elevating mechanism.

A door 13 is arranged in the transfer space 10. The door 13 is provided with means for detaching the lid 3a from the transporting container 3 placed on the transfer stage 8 so as to expose the opening of the transporting container 3 to the transfer space 10.

The transfer space 10 has a transfer mechanism 14 for transferring the wafers W between the transporting container 3 on the transfer stage 8 and the unloaded boat 12.

Figure 2:
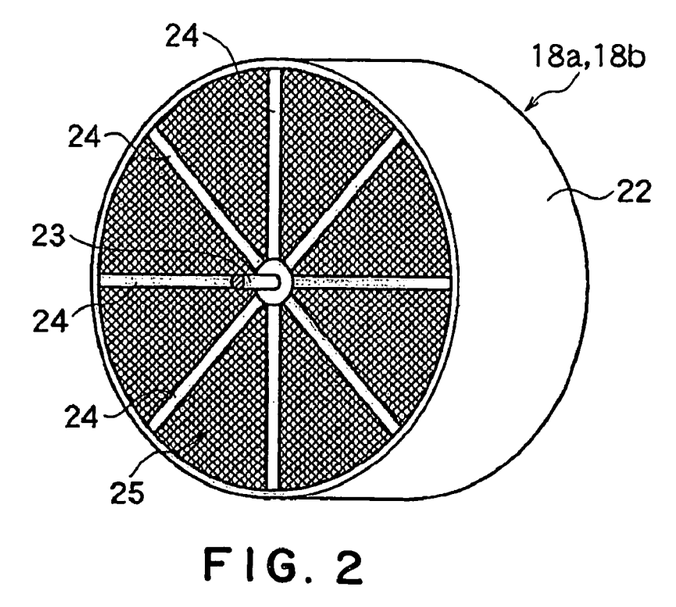
FIG. 2 is a perspective view showing a rotor of the dry air supplying apparatus shown in FIG. 1.
Figure 3:
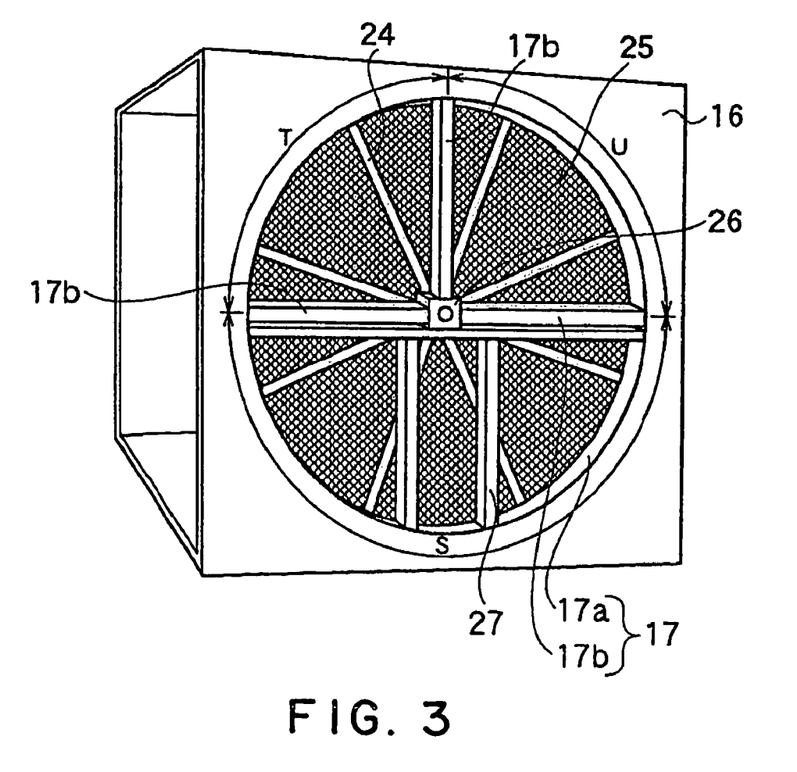
FIG. 3 is a perspective view showing the rotor shown in FIG. 2 which is fixed on a support frame.

The dry air supplying apparatus 15 is connected to the processing system 1 to supply dry air of a low dew point into the transfer space 10. As shown in FIGS. 1, 2 and 3, the dry air supplying apparatus 15 includes: two rotors 18a and 18b respectively supported by support frames 16; a common drive means such as an electric motor 19 for driving both the rotors 18a and 18b for rotation; a circulation passage 20 for guiding air sucked from the transfer space 10 to sequentially pass through absorbing zones S of the rotors 18a and 18b, and supply the dry air, from which moisture and organic matters are removed by the absorbing zones S of the rotors 18a and 18b, into the transfer space 10; and an exhaust passage 21 for heating a part of the dry air and guiding the air to pass through the recovery zones U of the rotors 18a and 18b for desorbing the moisture and the organic matters from absorbents. Each of the rotors 18a and 18b has structures each carrying an absorbent. Partitioning members 17 are arranged at opposite ends of each of the rotors 18a and 18b. The partitioning members 17 define a plurality of zones (the absorbing zone S, the recovery zone U) in the rotor 18a (18b), depending on the angular position of the rotor 18a (18b) relative to the corresponding partitioning members 17.

Each of the rotors 18a and 18b is mainly composed of: a cylindrical body 22 having opposite open ends; a rotation shaft 23 positioned at the center of the cylindrical body 22; plate-like spokes 24 radially extending from the rotary shaft 23 and fixed to inner circumference of the cylindrical body 22 to divide the interior of the cylindrical body 22 into a plurality of, for example, 8 chambers each having a sectoral cross-section; and honeycomb structures 25 each having a sectoral cross-section and held in each of the chambers. Each of the honeycomb structures 25 is formed of a substrate carrying an absorbent. Air can pass through the honeycomb structures 25 in the axial directions of the cylindrical body 22.

In order to efficiently absorb moisture and organic matters, the absorbent is preferably made of a rare-earth-substituted aluminosilicate, in which a part of sodium in hydrophilic zeolite is substituted by a rare earth element. The rare-earth-substituted aluminosilicate is represented by the following structural formula: $aM_xO_y \cdot bNa_2O \cdot cAl_2O_3 \cdot dSiO_2 \cdot eH_2O$, where M denotes a rare earth element, and the characters a, b, c, d, and e denote positive numbers. The rare-earth-substituted aluminosilicate may include only one kind of rare earth element, or a plurality of kinds of rare earth elements. $M_xO_y$ is preferably $La_2O_3$, $Nd_2O_3$, $CeO_3$, or $Pr_6O_{11}$. Preferably, the rare-earth-substituted aluminosilicate contains not less than 1% by weight of $M_xO_y$. More preferably, $M_xO_y$ is $La_2O_3$. It is preferable that the concentration of $La_2O_3$ in the rare-earth-substituted aluminosilicate is in the range of 4 to 10% by weight, which provides an improved absorption effect.

Preferably, the substrate of the honeycomb structure 25 is made of inorganic fibrous paper, because of its good heat resistance and abrasion resistance. The honeycomb structure 25 is manufactured by forming inorganic fibrous paper to have suitable honeycomb structures. In order for the substrate to carry the rare-earth-substituted aluminosilicate, the substrate is impregnated, by spraying or brush coating, with a slurry including the rare-earth-substituted aluminosilicate and an inorganic binder such as silica sol, and then the substrate is dried.

The support frame 16 is a box-shaped member having dimensions capable of receiving therein the rotor 18a (18b). Formed at opposite ends of the support frame 16 are circular openings 16a, which are shaped and positioned so as to correspond to those of the openings of the rotor 18a (18b).

Bearings 26 are disposed at the centers of the openings 16a to rotatably support opposite end portions of the rotation shaft 23, respectively. The bearings 26 are supported by support columns 27 and the partitioning members 17. The partitioning members 17 corresponding to the latter-stage rotor 18b is configured to define, in the latter-stage rotor 18b, a cooling zone T, in addition to the absorbing zone S and the recovery zone U.

Figure 4:
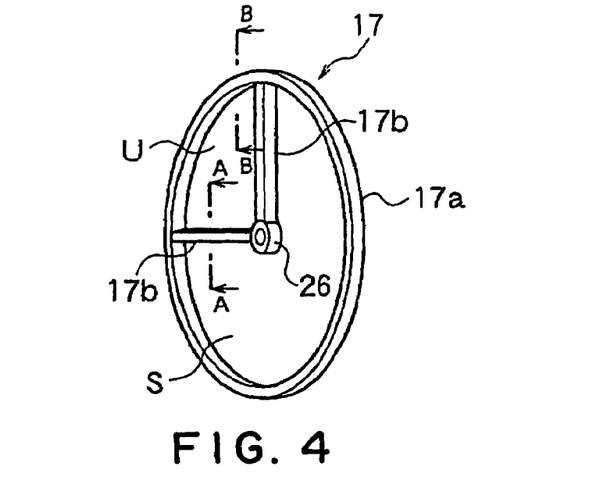
FIG. 4 is a perspective view schematically showing the structure of a partitioning member of the rotor shown in FIG. 2.
Figure 5:
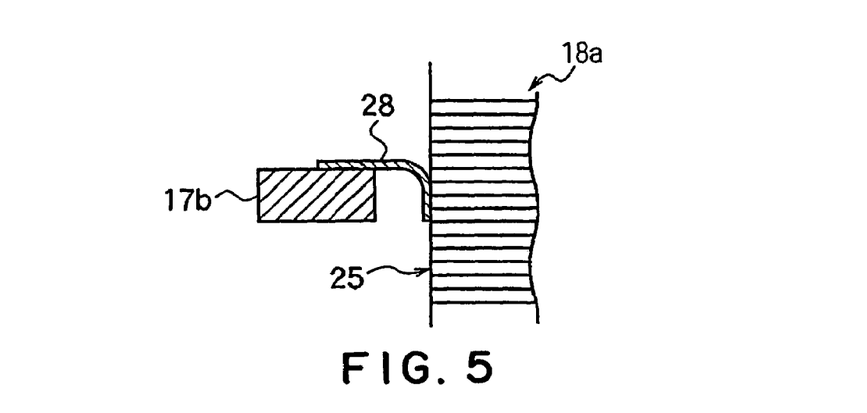
FIG. 5 is an enlarged cross-sectional view of the partitioning member shown in FIG. 4 taken along line A—A.

As shown in FIG. 4, the partitioning member 17 includes a circular circumferential element 17a arranged in correspondence to the periphery of the end portion of the rotor 18a (18b) or the cylindrical body 22, and a plurality of radial elements 17b extending from the center of the circumferential element 17a (e.g., the bearing 26) to the circumferential element 17a. As shown in FIG. 5, a fin-shaped (thin plate-like), flexible sealing member 28 is attached to each of the radial elements 17b. The sealing member 28 is pressed against the end face of the honeycomb structure 25 (i.e., the end face of the rotor 18a (18b)), whereby air having passed through the different zones is prevented from being mixed to each other. The sealing member 28 is formed of a material having elasticity and heat resistance, such as a rubber or a soft resin. The tip of the sealing member 28 is resiliently bent towards the rotation direction of the rotor 18a (18b). Thus, when the sealing member 28 slides on the honeycomb structure 25, a frictional resistance created between the sealing member 28 and the honeycomb structure 25, and abrasions of the sealing member 28 and the honeycomb structure 25 can be reduced.

Figure 6:
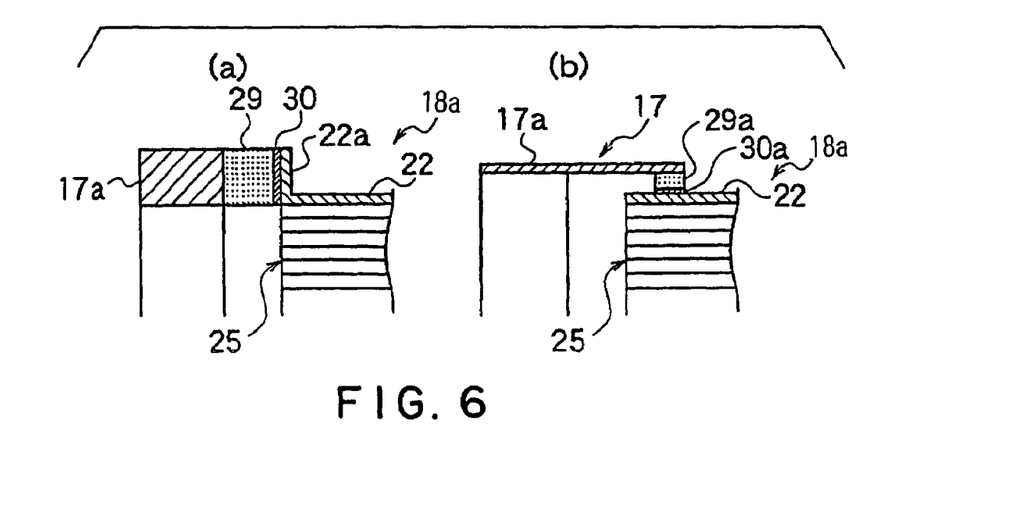
FIG. 6(a) is an enlarged cross-sectional view of the partitioning member shown in FIG. 4 taken along line B—B.
FIG. 6(b) is a view showing a modification of the embodiment shown in FIG. 6(a)
Figure 9:
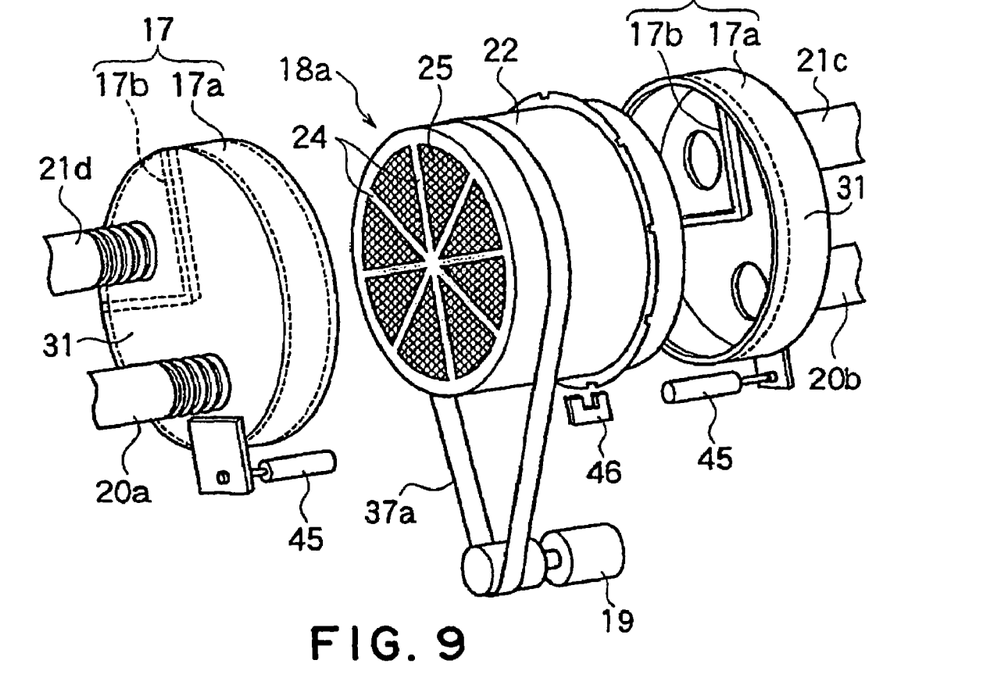
FIG. 9 is an exploded perspective view showing a modification of the dry air supplying apparatus shown in FIGS. 1 to 6.

As shown in FIG. 6(a), if the rotor 18a (18b) or the cylindrical body 22 has a flange 22a at its peripheral edge, the circumferential element 17a is provided with an annular packing member 29, which is in contact with and pressed against the flange 22a. A slip sheet 30 is preferably adhered to the packing member 29 to reduce a frictional resistance between the packing member 29 and the flange 22a when the packing member 29 slides on the flange 22a. As shown in FIG. 6(b), if no flange is arranged on the peripheral edge of the cylindrical body 22, the circumferential element 17a is configured as a cylinder having a diameter greater than that of the cylindrical body 22, and an annular packing member 29a is attached to the distal end of the circumferential element 17a and is pressed against the outer circumference of the cylindrical body 22. Also in this case, a slip sheet 30a is preferably adhered to the packing member 29a. Due to the above configurations, a gap between the circumferential element 17a and the peripheral edge or the outer circumference of the rotor 18a (18b) or the cylindrical body 22 can be sealed in an air-tight fashion; and the frictional force applied to the packing member 29 or 29a and an abrasion thereof can be reduced. As shown in FIG. 9, each partitioning member 17 is provided with a cover member 31 for covering a surface of the partitioning member 17. Pipes in communication with the absorbing zone S and the recovery zone U are connected to the cover member 31.

The circulation passage 20 includes: a sucking line 20a adapted to suck an atmosphere (air), to be processed, from the transfer space 10 of the processing system 1, and supply the same to the absorbing zone S of the former-stage stage rotor 18a; an intermediate line 20b adapted to supply, to the absorbing zone S of the latter-stage stage rotor 18b, the dry air of a low dew point, which has passed through the absorbing zone S of the former-stage rotor 18a, and from which moisture and organic matters have been removed; and a supplying line 20c adapted to supply, to the transfer space 10, the dry air of a low dew point, which has passed through the absorbing zone S of the latter-stage rotor 18b, and from which moisture and organic matters are further removed.

Not all the air taken out from the transfer space 10 is circulated and returned to the transfer space 10, but a part of the air taken out from the transfer space 10 is used as a absorbent recovery gas and then is exhausted. Thus, the sucking line 20a is preferably provided with an air inlet 32 for taking an amount of air, corresponding to that of the air to be exhausted, into the sucking line 20a. The intermediate line 20b is provided with: a fan 33 adapted to send the air from the upstream (former-stage rotor 18a) side to the downstream (latter-stage rotor 18b) side; and a cooler 34, namely, means for cooling the dry air of a low dew point having passed through the absorbing zone S of the former-stage rotor 18a, from which moisture and organic matters have been removed, to a predetermined temperature such as about 15° C. In order to prevent the wafers W in the transfer space 10 from being contaminated with particles due to the dry air supplying apparatus 15, a filter 35 for removing particles generated at contact points between the rotors 18a and 18b and the partitioning members 17 is disposed in an outlet portion of the circulation passage 20, namely, the supplying line 20c.

The exhaust passage 21 includes: a first line 21a branched, at a position just downstream of the latter-rotor 18b, from the supplying line 20c of the circulation passage 20, and adapted to take out a part of the clean dry air of a low dew point and supply the same, as a cooling gas, to the cooling zone T of the latter-rotor 18b; a second line 21b adapted to supply, as a recovery gas, the dry air having passed through the cooling zone T to the recovery zone U of the latter-stage rotor 18b; a third line 21c adapted to supply the air having passed through the recovery zone U of the latter-stage rotor 18b to the recovery zone U of the former-stage rotor 18a; and a fourth line 21d adapted to exhaust the air having passed through the recovery zone U of the former-stage rotor 18a to, for example, a factory exhaust system. The second line 21b and the third line 21c are respectively provided with heaters 36a and 36b, which are means for heating the air to a predetermined temperature so as to obtain a recovery gas. The fourth line 21d is provided with an exhaust fan 39.

During a normal operation, the air for recovery is heated by the heaters 36a and 36b at a temperature in the range of about 130 to 200° C., and is supplied to the recovery zones U of the rotors 18a and 18b, whereby moisture and gaseous impurities (organic matters) absorbed by the absorbents are desorbed therefrom. It is preferable that the air for recovery is heated by the heaters 36a and 36b at a higher temperature in the range of about 250 to 400° C. to be supplied to the recovery zones U at regular time intervals, in order to desorb high boiling point organic compounds from the absorbents.

The two rotors 18a and 18b are arranged in parallel with each other, with the motor 19 being interposed therebetween. Two belt wheels 38a and 38b (also referred to as pulleys) are mounted on a rotation shaft of the motor 19, for driving the rotors 18a and 18b for rotation via endless belts 37a and 37b, respectively. The endless belt 37a is extended around the rotor 18a and the belt wheel 38a, while the endless belt 37b is extended around the rotor 18b and the belt wheel 38b. Since the belt wheels 38a and 38b have different diameters, different rotation speeds can be set for the respective rotors 18a and 18b. In the illustrated embodiment, the rotation speed of the former-stage rotor 18a is set at 10 revolutions per hour, while the rotation speed of the latter-stage rotor 18b is set at 0.5 revolutions per hour, so that the absorbents carried by the honeycomb structures 25 of the rotors 18a and 18b can effectively absorb moisture and organic matters, and the absorbents absorbing the moisture and the organic matters can effectively be recovered by desorbing therefrom the moisture and the organic matters. Preferably, the rotation speeds of the rotors 18a and 18b are determined at optimal values taking into consideration the factors, such as the area ratio of the absorbing zone S and the recovery zone U (3:1 in the illustrated embodiment) of the former-stage rotor 18a, the area ratio of the absorbing zone S, the recovery zone U, and the cooling zone T (2:1:1 in the illustrated embodiment) of the latter-stage rotor 18b, an absorbing efficiency of each of the absorbing zones S, and a recovery efficiency of each of the recovery zones U.

In order that the transfer space 10 is constantly, automatically maintained at a predetermined low dew point, for example, low due point temperature of −80° C., it is preferable to provide a dew-point meter 40 arranged in the transfer space 10 of the processing system 1 to measure the dew point (dew-point temperature) of the atmosphere in the transfer space 10, and a dry air controller 41 for controlling the dry air supplying apparatus 15, namely, the motor 19, the fans 33 and 39, the heaters 36a and 36b, and the cooler 34, based on the detected dew point by the dew-point meter 40, such that the dew point of the atmosphere in the transfer space 10 is maintained at a predetermined value. The dry air controller 41 preferably has a function for giving an alarm, or stopping an operation of the dry air supplying apparatus 15, when the dry air controller 41 cannot control the dew point of the atmosphere in the transfer space 10 at the predetermined value.

It is also preferable to provide a system controller 42 for controlling the processing system 1 and the dry air supplying apparatus 15 based on a preset operation program, while monitoring signals from the processing system 1 and the dry air supplying apparatus 15. In a factory where a plurality of sets of processing systems 1 and the dry air supplying apparatuses 15 are equipped, a superordinate controller 43 is preferably provided for controlling the plurality sets of processing systems 1 and the dry air supplying apparatuses 15.

With the above configuration, air (having a temperature of about 23° C., and a dew point of about 1.96° C.) in the transfer space 10 of the processing system 1 is supplied to the absorbing zone S of the former-stage rotor 18a through the sucking line 20a of the circulation passage 20, and is then dehumidified and cleaned (moisture and organic matters are removed from the air) by the absorbent carried by the rotor 18a. At this time, the temperature of the dry clean air is about 45° C., and a dew point thereof is about −20° C. After the clean dry air is cooled by the cooler 34 at about 15° C., the cooled clean dry air is supplied to the absorbing zone S of the latter-stage rotor 18b in which the air is further dehumidified and cleaned, and thereafter, the clean dry air having a temperature of about 23° C. and a dew point of −80° C. is supplied into the transfer space 10 of the processing system 1 through the supplying line 20c.

With the latter-stage rotor 18b, a part of the clean dry air of a low dew point is supplied, through the first line 21a of the branched exhaust passage 21, to the cooling zone T to be used as a cooling gas. Then, the part of the air is heated by the heater 36a arranged on the second line 21b and is supplied as a heating gas for recovery to the recovery zone U, where moisture and organic matters adhered to the absorbent of the rotor 18b are vaporized and removed (desorbed) therefrom. The air (i.e., recovery gas) exhausted from the recovery zone U of the latter-stage rotor 18b is again heated by the heater 36b arranged on the third line 21c and is supplied to the recovery zone U of the former-stage rotor 18a. By means of the recovery gas of a high temperature, moisture and the organic matters absorbed by the absorbent of the rotor 18a are vaporized and removed (desorbed) therefrom. Finally, the air is exhausted through the fourth line 21d.

As described above, the dry air supplying apparatus 15 includes: two rotors 18a and 18b rotatably supported by the support frames 16, each of the rotors 18a and 18b carrying the absorbent; the partitioning members 17 respectively supported by the support frames 16, each of the partitioning members 17 defining at least the absorbing zone S and the recovery zone U in the rotor 18a (18b) corresponding to the partitioning member 17, depending on an angular positional relationship between the rotor 18a (18b) and the corresponding partitioning member 17, wherein in the absorbing zone S, moisture and organic matters are removed from air passing therethrough by the absorbent in the absorbing zone S, and in the recovery zone U, the absorbent deteriorated due to absorption of the moisture and the organic matters is recovered; the common drive means 19 for driving both the rotors 18a and 18b for rotation; the circulation passage 20 that guides air sucked from a target space (transfer space 10) so as to sequentially pass through the absorbing zones S of the rotors 18a and 18b for removing moisture and organic matters from the air, and thereafter return to the target space 10; and the exhaust passage 21, provided with heating means 36a and 36b, that guides a part of the air having passed through the absorbing zones S of the rotors 18a and 18b so as to pass through the heating means 36a and 36b, and thereafter pass through the recovery zones U of the rotors 18a and 18b for desorbing the moisture and the organic matters from the absorbents of the rotors 18a and 18b. Accordingly, moisture and organic matters in the target space 10 can be removed therefrom. Further, the structure of the dry air supplying apparatus 15 can be simplified, which leads to a reduction in a manufacturing cost thereof.

The processing system 1 includes: the processing unit 9 adapted to perform a predetermined process to a process object; the transfer space 10 in which a process object to be processed by the processing unit 9 or a process object having been processed by the processing unit 9 is conveyed; and the dry air supplying apparatus 15 adapted to supply air, from which moisture and organic matters are removed, into the transfer space 10; the dry air supplying apparatus 15 including: two rotors 18a and 18b rotatably supported by the support frames 16, each of the rotors 18a and 18b carrying the absorbent; the partitioning members 17 respectively supported by the support frames 16, each of the partitioning members 17 defining at least the absorbing zone S and the recovery zone U in the rotor 18a (18b) corresponding to the partitioning member 17, depending on an angular positional relationship between the rotor 18a (18b) and the corresponding partitioning member 17, wherein in the absorbing zone S, moisture and organic matters are removed from air passing therethrough by the absorbent in the absorbing zone S, and in the recover zone U, the absorbent deteriorated due to absorption of the moisture and the organic matters is recovered; the common drive means 19 for driving both the rotors 18a and 18b for rotation; the circulation passage 20 that guides air sucked from a target space (transfer space 10) so as to sequentially pass through the absorbing zones S of the rotors 18a and 18b for removing moisture and organic matters from the air, and thereafter return to the target space 10; and the exhaust passage 21, provided with heating means 36a and 36b, that guides a part of the air having passed through the absorbing zones S of the rotors 18a and 18b so as to pass through the heating means 36a and 36b, and thereafter pass through the recovery zones U of the rotors 18a and 18b for desorbing the moisture and the organic matters from the absorbents of the rotors 18a and 18b. Accordingly, moisture and organic matters in the transfer space 10 can be removed therefrom. In addition, a growth of a natural oxide film can be prevented, while eliminating a possibility of oxygen deficiency. Furthermore, the structure of the processing system 1 can be simplified, which results in a reduction in a manufacturing cost thereof.

In the circulation passage 21, the cooling means 34 is arranged between the former-stage rotor 18a and the latter-stage rotor 18b of the two rotors 18a and 18b, for cooling air having passed through the absorbing zone S of the former-stage rotor 18a. The partitioning member 17 corresponding to the latter-stage rotor 18b is configured to define, in the latter-stage rotor 18b, the cooling zone T in which the component member 25 carrying the absorbent is cooled, in addition to the absorbing zone S and the recovery zone U. The exhaust passage 21 is configured to guide the air, having passed through the former-stage rotor 18a, the cooling means 34, and the latter-stage rotor 18b, to pass through the cooling zone T of the latter-stage rotor 18b before the air passes through the recovery zones U of the former-stage rotor 18a and the latter-stage rotor 18b and the heating means 36a and 36b. In this manner, after a part of the latter-stage rotor 18b which is heated to be used as the recovery zone U is then cooled to be used as the cooling zone T, and thereafter the part is used as the absorbing zone S. Therefore, the air to be supplied to the transfer space 10, after having passed through the recovery zone U of the latter-stage rotor 18b, is prevented from being heated.

The filter 35 is disposed on the outlet portion of the circulation passage 20 connected to the transfer space 10, for removing particles generated from the contact points between the rotors 18a and 18b and the partitioning members 17 respectively corresponding thereto. Consequently, in the transfer space 10, the wafers W can be prevented from being contaminated with particles which are generated in the dry air supplying apparatus 15.

The drive means 19 has the two belt wheels 38a and 38b to drive the two rotors 18a and 18b for rotation via the endless belts 37a and 37b. The two belt wheels 38a and 38b have different diameters so that the two rotors 18a and 18b rotate at different speeds. Accordingly, the number of revolutions of the two rotors 18a and 18b can be easily set at different values, with a simple structure of the dry air supplying apparatus 15.

The processing system 1 further includes the dew-point meter 40 disposed in the transfer space 10, and the dry air controller 41 for controlling the dry air supplying apparatus 15 to maintain the dew point of an atmosphere in the transfer space 10 at a predetermined value. Accordingly, the dew point of the atmosphere in the transfer space 10 can be constantly, automatically maintained at a predetermined value.

Figure 7:
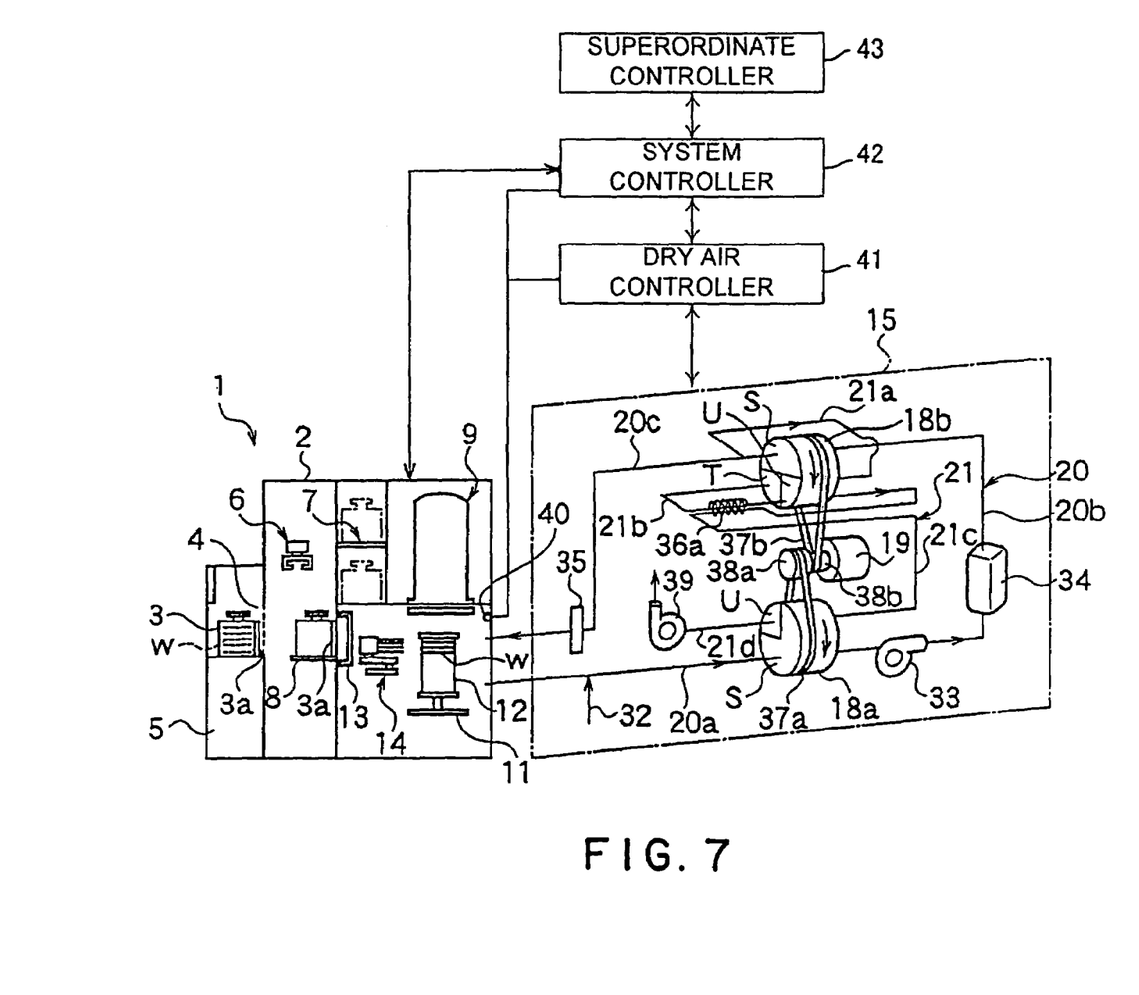
FIG. 7 is a view schematically showing the structure of a modification of the processing system shown in FIG. 1.

FIG. 7 shows the structure of a modification of the processing system including a dry air supplying apparatus. In the modification of FIG. 7, the same parts as those of the embodiment of FIG. 1 are designated by the same reference numerals, and only the different parts will be described. As shown in FIG. 7, an exhaust passage 21 is provided with a common heating means such as a heater 36a for heating dry air (i.e., recovery gas) to be supplied respectively to recovery zones U of two rotors 18a and 18b. That is, a second line 21b and a third line 21c having respective parts arranged adjacent to each other, and the common heater 36a is wound around the adjacent parts. Since the single heater 36a heats dry air to be supplied respectively to the recovery zones U of the two rotors 18a and 18b, a simple and compact configuration of the apparatus and a reduced manufacturing cost of the apparatus can be achieved.

Figure 8:
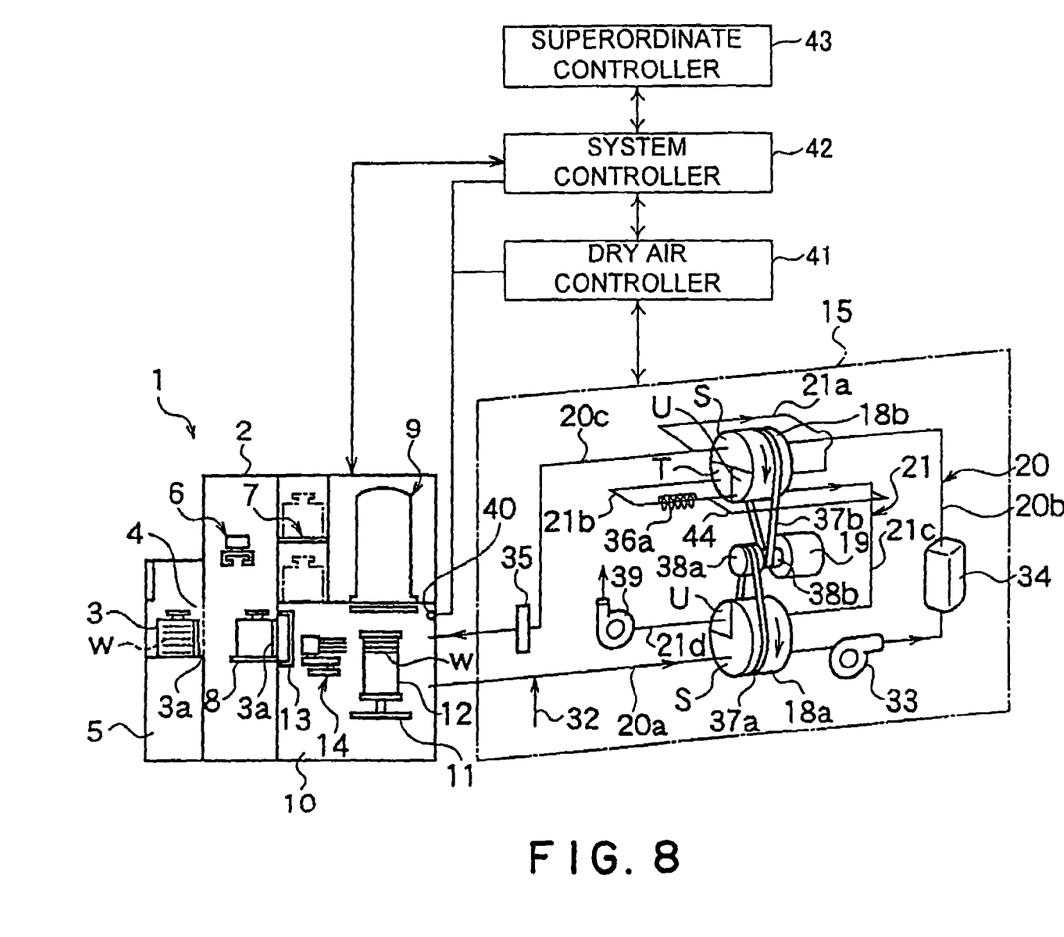
FIG. 8 is a view schematically showing a structure of another modification of the processing system shown in FIG. 1.

FIG. 8 shows another modification in which an exhaust passage 21 is provided with a common heating means such as a heater 36a to heat dry air (i.e., recovery gas) to be supplied respectively to recovery zones U of two rotors 18a and 18b, which is similar to the modification of FIG. 7. In this modification, a branch pipe 44 bypassing the latter-rotor 18b is branched from a second line 21b at a position downstream of the heater 36a, and is joined to a third line 21c. Also in this modification, a simple and compact configuration of the apparatus and a reduced manufacturing cost of the apparatus can be achieved.

Figure 10:
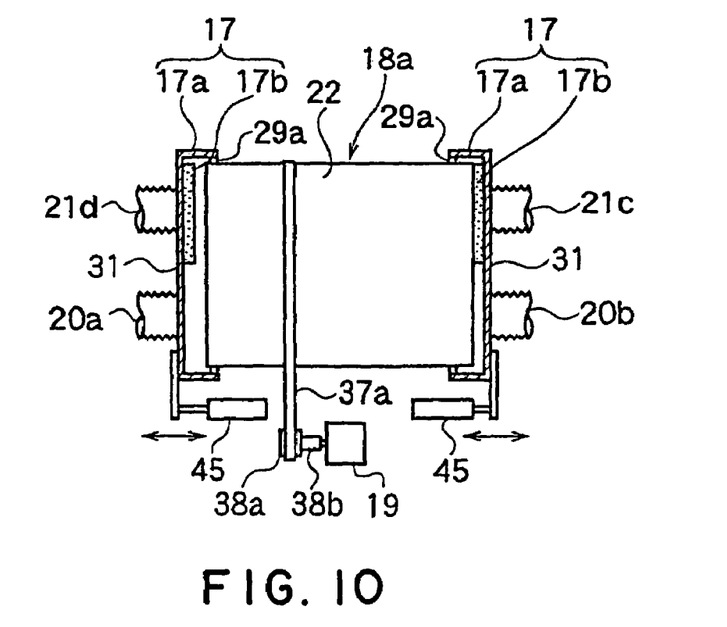
FIG. 10 is a cross-sectional view schematically showing the structure of the dry air supplying apparatus shown in FIG. 9.

FIGS. 9 and 10 show a modification of the dry air supplying apparatus. In the modifications of FIGS. 9 and 10, the same parts as those of the aforementioned embodiments are designated by the same reference numerals, and only the different parts will be described. In FIGS. 9 and 10, a rotation shaft of a rotor 18a is omitted. The rotor 18a may be configured without including a rotation shaft. In this case, an outer circumference of the rotor 18a is supported such that the rotor 18a can rotate. The rotor 18a intermittently rotates. The partitioning members 17 leave the end faces of the rotor 18a when the rotor 18a is rotating (see left part of FIG. 10), and contact the end faces of the rotor 18a when the rotor 18a halts rotation (see right part of FIG. 10).

The partitioning member 17 having a cover member 31 is provided with means, such as an air cylinder 45, for moving the partitioning member 17 toward or away from the end face of the rotor 18a. A sensor 46 is provided for detecting a rotation angle of the rotor 18a. A motor 19 is intermittently driven based on detection signals by the sensor 46, such that the rotor 18a can intermittently rotate, like a revolver, at every predetermined rotation angle.

In the dry air supplying apparatus 15 shown in FIGS. 9 and 10, the rotor 18a intermittently rotates, and the partitioning members 17 are configured to leave the end faces of the rotor 18a when the rotor 18a is rotating, and contact the end faces of the rotor 18a when the rotor 18a halts rotation. Therefore, the rotor 18a does not slide on the partitioning member 17, thereby to prevent generation of particles from contact points between the rotor 18a and the portioning members 17.

Although the embodiments of the present invention have been described above with reference to the drawings, the present invention is not limited thereto, and various modifications are possible without departing from the gist of the present invention. For example, although the exhaust passage 21 shown in FIG. 1 is provided with the two heaters 36a and 36b, the heater 36b may be omitted so that the exhaust passage 21 is provided with only one heater 36a. In addition, a plurality of processing systems 1 may share the dry air supplying apparatus 15. In other words, dry air may be supplied by the dry air supplying apparatus 15 to a transfer space 10 of another processing system 1. In this way, the system configuration becomes more simplified and the system manufacturing cost can be further reduced.

The invention claimed is:

1. A dry air supplying apparatus, comprising:
   two rotors respectively supported by support frames, each of the rotors having a component member carrying an absorbent;
   partitioning members respectively supported by the support frames, each of the partitioning members defining at least an absorbing zone and a recovery zone in the rotor corresponding to the partitioning member, depending on an angular positional relationship between the rotor and the corresponding partitioning member, wherein, in the absorbing zone, moisture and organic matters are removed from air passing therethrough by the absorbent in the absorbing zone, and in the recovery zone, the absorbent deteriorated due to absorption of the moisture and the organic matters is recovered;
   a common drive means for driving both the rotors for rotation, the common drive means including a single motor and driving force transmitting members that transmit driving force generated by the single motor to the two rotors to drive the rotors for rotation, respectively;
   a circulation passage that guides air sucked from a target space so as to sequentially pass through the absorbing zones of the rotors for removing moisture and organic matters from the air, and thereafter return to the target space; and
   an exhaust passage, provided with heating means, that guides a part of the air having passed through the absorbing zones of the rotors so as to pass through the heating means, and thereafter pass through the recovery zones of the rotors for desorbing the moisture and the organic matters from the absorbents of the rotors.

2. A processing system comprising:
   a processing unit adapted to perform a predetermined process to a process object;
   a transfer space in which a process object to be processed by the processing unit or a process object having been processed by the processing unit is conveyed; and
   a dry air supplying apparatus adapted to supply air, from which moisture and organic matters are removed, into the transfer space; said dry air supplying apparatus including: two rotors respectively supported by support frames, each of the rotors having a component member carrying an absorbent; partitioning members respectively supported by the support frames, each of the partitioning members defining at least an absorbing zone and a recovery zone in the rotor corresponding to the partitioning member, depending on an angular positional relationship between the rotor and the corresponding partitioning member, wherein, in the absorbing zone, moisture and organic matters are removed from air passing therethrough by the absorbent in the absorbing zone, and in the recovery zone, the absorbent deteriorated due to absorption of the moisture and the organic matters is recovered;

a common drive means for driving both the rotors for rotation, the common drive means including a single motor and driving force transmitting members that transmit driving force generated by the single motor to the two rotors to drive the rotors for rotation, respectively;

a circulation passage that guides air sucked from the transfer space so as to sequentially pass through the absorbing zones of the rotors for removing moisture and organic matters from the air, and thereafter return to the transfer space; and an exhaust passage, provided with heating means, that guides a part of the air having passed through the absorbing zones of the rotors so as to pass through the heating means, and thereafter pass through the recovery zones of the rotors for desorbing the moisture and the organic matters from the absorbents of the rotors.

3. The processing system according to claim 2, wherein: cooling means is arranged in the circulation passage between a former-stage rotor and a latter-stage rotor of said two rotors, for cooling air having passed through the absorbing zone of the former-stage rotor;

the partitioning member corresponding to the latter-stage rotor is configured to define, in the latter-stage rotor, a cooling zone in which the component member carrying the absorbent is cooled, in addition to the absorbing zone and the recovery zone; and the exhaust passage is configured to guide air, having passed through the former-stage rotor, the cooling means and the latter-stage rotor, to pass through the cooling zone of the latter-stage rotor before the air passes through the recovery zones of the former-stage rotor and latter-stage rotor and the heating means.

4. A processing system comprising:

a processing unit adapted to perform a predetermined process to a process object;

a transfer space in which a process object to be processed by the processing unit or a process object having been processed by the processing unit is conveyed; and a dry air supplying apparatus adapted to supply air, from which moisture and organic matters are removed, into the transfer space: said dry air supplying apparatus including;

two rotors respectively supported by support frames, each of the rotors having a component member carrying an absorbent;

partitioning members respectively supported by the support frames, each of the partitioning members defining at least an absorbing zone and a recovery zone in the rotor corresponding to the partitioning member, depending on an angular positional relationship between the rotor and the corresponding partitioning member, wherein, in the absorbing zone, moisture and organic matters are removed from air passing therethrough by the absorbent in the absorbing zone, and in the recovery zone, the absorbent deteriorated due to absorption of the moisture and the organic matters is recovered;

a common drive means for driving both the rotors for rotation;

a circulation passage that guides air sucked from the transfer space so as to sequentially pass through the absorbing zones of the rotors for removing moisture and organic matters from the air, and thereafter return to the transfer space; and an exhaust passage, provided with heating means, that guides a part of the air having passed through the absorbing zones of the rotors so as to pass through the heating means, and thereafter pass through the recovery zones of the rotors for desorbing the moisture and the organic matters from the absorbents of the rotors, wherein an outlet portion of the circulation passage connected to the transfer space is provided with a filter in order to remove particles generated at contact points between the rotors and the partitioning members.

5. A processing system comprising:

a processing unit adapted to perform a predetermined process to a process object;

a transfer space in which a process object to be processed by the processing unit or a process object having been processed by the processing unit is conveyed; and a dry air supplying apparatus adapted to supply air, from which moisture and organic matters are removed, into the transfer space: said dry air supplying apparatus including;

two rotors respectively supported by support frames, each of the rotors having a component member carrying an absorbent;

partitioning members respectively supported by the support frames, each of the partitioning members defining at least an absorbing zone and a recovery zone in the rotor corresponding to the partitioning member, depending on an angular positional relationship between the rotor and the corresponding partitioning member, wherein, in the absorbing zone, moisture and organic matters are removed from air passing therethrough by the absorbent in the absorbing zone, and in the recovery zone, the absorbent deteriorated due to absorption of the moisture and the organic matters is recovered;

a common drive means for driving both the rotors for rotation;

a circulation passage that guides air sucked from the transfer space so as to sequentially pass through the absorbing zones of the rotors for removing moisture and organic matters from the air, and thereafter return to the transfer space; and an exhaust passage, provided with heating means, that guides a part of the air having passed through the absorbing zones of the rotors so as to pass through the heating means, and thereafter pass through the recovery zones of the rotors for desorbing the moisture and the organic matters from the absorbents of the rotors, wherein the drive means has two belt wheels to drive the two rotors for rotation via endless belts, respectively, and the two belt wheels have different diameters so that the two rotors rotate at different speeds.

6. The processing system according to claim 2, wherein the exhaust passage is provided with a common heating means to heat air to be supplied respectively to the recovery zones of the two rotors.

7. The processing system according to claim 2, further comprising: a dew-point meter adapted to measure a dew point of an atmosphere of the transfer space; a dry air controller adapted to control the dry air supplying apparatus based on a measured result by the dew-point meter so that the dew point in the transfer space is maintained at a predetermined value.

8. The processing system according to claim 2, wherein: the partitioning member includes a circumferential element arranged in correspondence to a periphery of an end portion of the rotor, and a plurality of radial elements extending from a center of the circumferential element to the circumferential element to divide a space surrounded by the circumferential element into a plurality of zones; and a fin-shaped, flexible sealing member is attached to each of the radial elements, the sealing member is pressed against an end face of the rotor facing the sealing member, and each of the sealing members is configured so that the sealing member slides on the end face of the rotor facing to the sealing member while a tip of the sealing member is resiliently bent towards a rotation direction of the rotor facing the sealing member; whereby air having passed through the different zones of each of the rotors is prevented from being mixed.

9. The processing system according to claim 8, wherein the circumferential element of each of the partitioning members is provided with a circumferential packing member to be pressed against a peripheral edge or an outer circumference of the rotor facing the circumferential element, and a slip sheet is adhered to a contact surface of the packing member facing the rotor corresponding to the packing member.

10. The processing system according to claim 2, wherein: the drive means is configured to intermittently rotate the two rotors; and the partitioning member is configured to leave an end face of the rotor facing the partitioning member when the rotor is rotating, and contact the end face of the rotor when the rotor halts rotation.

11. The processing system according to claim 2, wherein the dry air supplying apparatus is connected to a transfer space of another processing system.

12. The processing system according to claim 1, wherein the rotors have respective rotation axes which are not aligned with each other.

13. The processing system according to claim 2, wherein the rotors have respective rotation axes which are not aligned with each other.

14. The processing system according to claim 1, wherein the driving force transmitting members comprise endless belts.

15. The processing system according to claim 2, wherein the driving force transmitting members comprise endless belts.

* * * * *